(12) United States Patent
Mirell et al.

(10) Patent No.: US 8,081,383 B1
(45) Date of Patent: Dec. 20, 2011

(54) COUPLER AND RELATED METHOD FOR EQUILIBRATING A DUALITY MODULATED BEAM WITH ANOTHER BEAM USING ONE OR MORE MACH-ZEHNDER STAGES

(76) Inventors: Stuart G. Mirell, Los Angeles, CA (US); Daniel J. Mirell, Irvine, CA (US)

( * ) Notice: Subject to any disclaimer, the term of this patent is extended or adjusted under 35 U.S.C. 154(b) by 0 days.

(21) Appl. No.: 13/023,396

(22) Filed: Feb. 8, 2011

Related U.S. Application Data (60) Continuation of application No. 11/845,079, filed on Aug. 26, 2007, now abandoned, which is a division of application No. 11/188,198, filed on Jul. 22, 2005, now Pat. No. 7,262,914.

(51) Int. Cl.
 *G02B 27/00* (2006.01)
(52) U.S. Cl. ........................................ 359/577
(58) Field of Classification Search .................. None
 See application file for complete search history.

(56) References Cited

U.S. PATENT DOCUMENTS

| | | | | |
|---|---|---|---|---|
| 6,028,686 A * | 2/2000 | Mirell et al. | ................ | 398/201 |
| 6,630,290 B2 * | 10/2003 | Williams et al. | ................ | 430/321 |
| 6,804,470 B1 * | 10/2004 | Mirell et al. | ................ | 398/182 |
| 7,262,914 B2 * | 8/2007 | Mirell et al. | ................ | 359/566 |
| 7,528,380 B1 * | 5/2009 | Mirell et al. | ................ | 250/396 R |
| 2002/0131134 A1 * | 9/2002 | Hait | ................ | 359/181 |

* cited by examiner

*Primary Examiner* — Arnel C Lavarias
(74) *Attorney, Agent, or Firm* — Noel F. Heal (57) ABSTRACT

A generator of duality modulated radiation, of which the irradiance, the wave intensity, or both, are varied from ordinarily equivalent levels, either for purposes of providing energy depleted or energy enriched radiation or for purpose of encoding an information signal. Various techniques are disclosed for restoring irradiance levels to "ordinary" levels, or for amplifying irradiance without affecting wave intensity. A communication system also employs duality modulated radiation.

7 Claims, 7 Drawing Sheets

COUPLER AND RELATED METHOD FOR EQUILIBRATING A DUALITY MODULATED BEAM WITH ANOTHER BEAM USING ONE OR MORE MACH-ZEHNDER STAGES

CROSS-REFERENCE TO RELATED APPLICATION

This is a continuation of pending application Ser. No. 11/845,079, filed Aug. 26, 2007, entitled "A Coupler of Duality Modulated Radiation and Related Method," which was a divisional of prior application Ser. No. 11/188,198, filed Jul. 22, 2005, entitled "Method and Apparatus for Generating and Detecting Duality Modulated Electromagnetic Radiation," and issued Aug. 28, 2007 as U.S. Pat. No. 7,262,914. The entire disclosures of the prior applications are hereby incorporated by reference into the present application.

BACKGROUND OF THE INVENTION

This invention relates generally to techniques for generating electromagnetic (photon) radiation modulated in energy relative to wave intensity and for demodulating that radiation. In particular, the invention relates to applications of such modulated electromagnetic radiation in which it would be highly desirable to modulate the radiation with information, where that radiation simultaneously is highly depleted in its relative proportion of energy. For example, it is well known in the art that photon beams may be used to scan and characterize a target object that is potentially damaged by excessive absorption of energy. Alternatively, in other particular applications it may be desirable to minimize the target object's capability to conventionally detect an interrogating scan beam. In various communications applications, the objective may be to securely transmit a signal beam without incurring interception and detection by conventional receivers. All of these applications would benefit from the use of beams highly depleted in energy relative to wave intensity.

The theoretical principles predicting the existence of energy depletion have been reported earlier by the inventors and others. Some of the basic concepts for producing energy depletion have been previously described by the inventors. See, for example:

U.S. Pat. No. 6,028,686, Feb. 22, 2000, by Stuart G. Mirell and Daniel J. Mirell, "Energy-Depleted Radiation Apparatus and Method," and references cited therein.

U.S. Pat. No. 6,804,470, Oct. 12, 2004, by Stuart G. Mirell and Daniel J. Mirell, "Energy-Depleted Radiation Apparatus and Method," and references cited therein.

De Broglie in 1927 reported in Rapport au V'ieme Congres de Physique Solvay, Gauthier-Villars, Paris 1930 and The Current Interpretation of Wave Mechanics: A Critical Study, Elsevier, Amsterdam (1969).

Stuart Mirell, "Correlated photon asymmetry in local realism," Physical Review A, Volume 50, No. 1, pp. 839-842 (1994).

Stuart Mirell and Daniel Mirell, "High Efficiency Interaction-free Measurement from Continuous Wave Multi-beam Interference," Quantum Physics abstract, on-line publication, available at arXiv.org, article id. quant-ph/9911076.

Stuart Mirell, "Locally real states of photons and particles," Physical Review A, Volume 65 p. 032102/1-22 March (2002).

Although these prior patents and publications explain the fundamental theory and early experimental verification of the principles of energy-depleted radiation, they fall short of teaching practical applications of these principles. The present invention is directed to a number of significant improvements for generating electromagnetic (photon) radiation modulated in energy relative to wave intensity and for demodulating that radiation.

SUMMARY OF THE INVENTION

Some definitions are particularly useful in the context of the invention. The photon beams relevant to this invention are mono-energetic and coherent. The modulation of energy relative to wave intensity requires that the energy be treated in the context of an irradiance I which is energy per unit time per unit area or, equivalently, energy flux density. This treatment is necessary since dimensionally an irradiance can be compared to a wave intensity. For a typical beam with a Gaussian cross section, the value of I is a maximum at the geometric center of that cross section and radially diminishes as a Gaussian function. It is common practice in the art to refer to that maximum value of I as the "irradiance of the beam at that cross section" even though that particular value applies only at the center of the beam. An energy sensitive detector of some small area 'da' sampling only the center of such a beam measures the fractional beam power (energy flux) incident on that area. A large area detector that effectively samples the entire beam cross section measures the total beam power. As a practical matter, even though the Gaussian function does not diminish to zero for finite radial distances, a sufficiently large detector can intercept and measure virtually the total beam power. That total power is given by the integral of I over the entire beam cross section represented by $\int I.da$ where I is understood to be the Gaussian-varying irradiance rather than the maximum value. A second essential quantity relevant to the invention is the beam wave intensity W that is a probability density or equivalently a probability per unit area of an irradiance I. Accordingly, for a Gaussian beam, both I and W are a maximum at the center and proportionately diminish radially. Then the ratio $\Omega = I/W$, defined here as the occupation value, is constant over the entire cross section of a beam since I and W vary proportionately. In the physical representation of quantum mechanics, W is an "absolute" probability density whereas in a physical representation of local realism, appropriate to the present invention, W is a "relative" probability density. The distinction between these two representations results in $\Omega = \Omega_O$, a constant for all beams in quantum mechanics whereas $\Omega$ may deviate from that $\Omega_O$ for specially prepared beams in local realism. When $\Omega < \Omega_O$, the beam is "depleted" and when $\Omega > \Omega_O$, the beam is "enriched". However, most generally encountered beams are defined as "ordinary" with $\Omega = \Omega_O$. (In quantum mechanics, all beams are ordinary and the occupation value is a superfluous quantity.) The more explicit beam identifications "energy depleted" and "energy enriched" are equivalent to depleted and enriched, respectively, where it is understood that the energy is evaluated as an irradiance that is then measured relative to the beam's wave intensity.

As a matter of general perspective, a reference to a particular beam implicitly denotes the wave structure of that beam and not its energy content. This perspective may be appreciated, for example, by the more explicit reference to a particular beam as a depleted beam which then denotes a beam on which the energy is reduced relative to the beam's wave structure. The integral $\int W da$ of W over an entire beam cross section is the total probability of the total beam power $\int I da$. Because I and W vary proportionately over the beam's cross section, $\int I da / \int W da = I/W$. Then the ratio of these integrals instead of the maximum value ratio I/W can be used to compute $\Omega$. However, the latter provides a simpler expression.

Moreover, there are frequent instances here where the scalar wave amplitude A must be considered. Since $A^2=W$, it is expedient to use the probability density W rather than the probability $\int W da$ whenever possible in order to readily express $\Omega$ as a function of the amplitudes.

Arbitrary units can be used such that $I=W$ for an ordinary beam. With these convenient units, $\Omega_O=1$.

A beam with $\Omega<1$ is depleted, with the degree of depletion being given by the deviation of $\Omega$ from unity. For example, expressed as a percentage, an $\Omega=0.90$ would have a 10% depletion. Conversely, an $\Omega>1$ represents an enriched beam. For example, an $\Omega=1.20$ expresses a 20% enrichment. Quantum mechanically, irradiance and wave intensity are considered to be the dual components of a photon beam relating to the point-like energy quantum of the photons and the wave-like interactive behavior of the photons. Accordingly, a beam modified in I relative to W, whether depleted or enriched, is defined in this specification as being "duality modulated." As the description proceeds, it will also be understood that the term "to modulate" is used in a general sense to mean to vary a selected characteristic of a beam, specifically its I and/or W levels. It should also be understood that one or both of the I or W levels of a beam may be varied, i.e., modulated, without encoding an information signal on the beam. For example, a beam may be duality modulated by depleting its irradiance I to a very low unvarying level, perhaps to avoid conventional detection of the beam. Then an information signal may be encoded onto the beam by conventionally modulating its phase, for example. Alternatively, the term "duality modulated" is also intended to encompass a beam in which I or W, or both, are varied in accordance with an information signal to be encoded onto the beam and recovered at a receiver.

In this description duality modulation is said to have different "types," wherein the type of duality modulation refers to whether the irradiance I is depleted or enriched with respect to the wave intensity W, or whether the wave intensity W is varied while maintaining the irradiance I constant.

As will become apparent from the more detailed description below, various applications of secure transmissions can utilize any level of depletion or enrichment by simultaneously encoding a wave intensity and an irradiance on a signal beam. These applications require the use of a receiver that can detect and demodulate the wave component of a beam. Particular novel means for detecting the wave component are disclosed below.

In a related application, novel coupling means can be employed to increase the irradiance I of an ordinary weak signal proportionate to the wave component W of that signal, thereby providing for direct amplification of the weak signal.

In general, the present invention provides improved means for altering the proportionality of irradiance I and wave intensity W on beams of electromagnetic radiation. This improvement is achieved by introducing specific physical changes in the periodic structure of a grating from which those beams emanate.

Further, the present invention demonstrates that this proportionality can be selectively "depleted" such that I is relatively lower than W, as well as "enriched" such that I is relatively higher than W. Novel means of coupling such depleted or enriched beams to other input beams are described, whereby the resultant outgoing beams acquire unexpected utilitarian properties. Additionally, novel applications utilizing both depletion and enrichment proportionality changes are described.

DESCRIPTION OF THE INVENTION

As shown in the drawings for purposes of illustration, the present invention is concerned with various techniques for modulating electromagnetic radiation such that its irradiance I is depleted or enriched with respect to its wave intensity W, and for related techniques for demodulating this radiation. It will be understood by those skilled in the art that references to a light beam in this description are not intended to limit the invention to apply to the modulation of light in the visible portion of the electromagnetic spectrum. Radiation at other frequencies, such as at various radio frequencies (RF) may be modulated and demodulated in accordance with the principles of the invention described, since it is well understood that optical components such as gratings and couplers have counterparts that perform analogous function in the RF portion of the spectrum.

Gratings of the "transmission" type are emphasized here in the method and apparatus for generating duality modulated electromagnetic radiation. Nevertheless, it may be appreciated, that gratings of the "reflection" type are equally applicable and are within the scope of the present invention.

Figure 1:
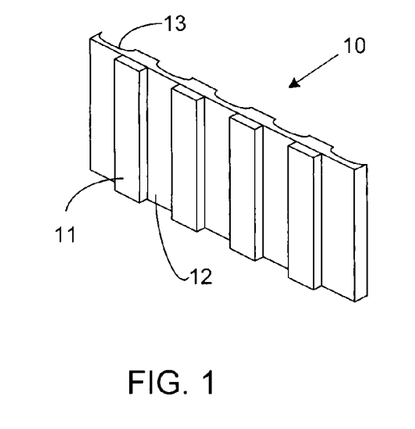
FIG. 1 is a detailed perspective view of a typical section of a transmission grating applicable to the invention showing periodic structures that include opaque regions and curvilinear transmissive regions.

FIG. 1 shows a small detailed section of a grating 10 that includes parallel opaque bands 11 and transmissive bands 12. These two features constitute a simple periodic structure consisting of an array of slits. Such a simple array is defined here as a "uniform" grating and is also an important component in the apparatus disclosed in our U.S. Pat. No. 6,804,470. The present invention additionally provides for a generalized periodic structure that may include various physical features departing from the basic grating. FIG. 1 illustrates one such departure, the inclusion of refractive plano-concave cylinder lenses 13 formed on a transmissive plate supporting the opaque bands 12.

Figure 2:
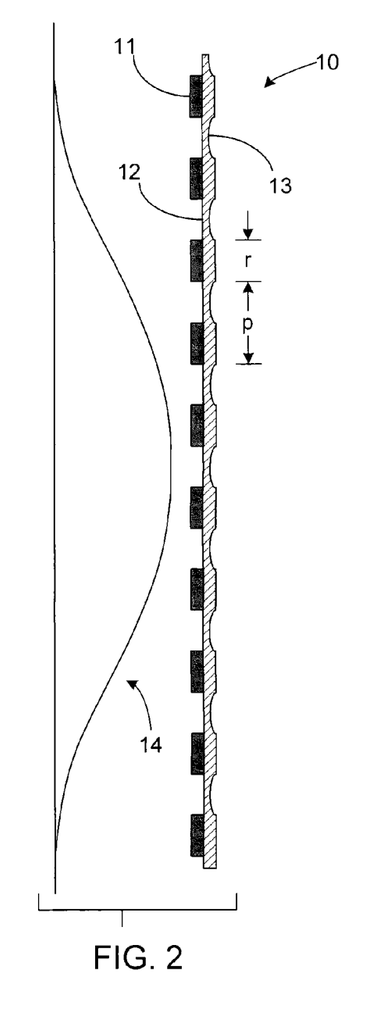
FIG. 2 is a typical detailed cross-sectional view of the FIG. 1 grating section and also shows the irradiance profile of a single incident Gaussian beam.

FIG. 2 is a detailed cross-section of the same grating as FIG. 1, in the region at which a Gaussian beam is incident, as shown by the irradiance profile 14. In this example, the width r of the opaque bands is one half the periodic width p of the periodic structure. For clarity and for purposes of illustration, the curvature of the lenses 13 and the thickness of the opaque bands 12 along the incident direction are greatly exaggerated.

Figure 3:
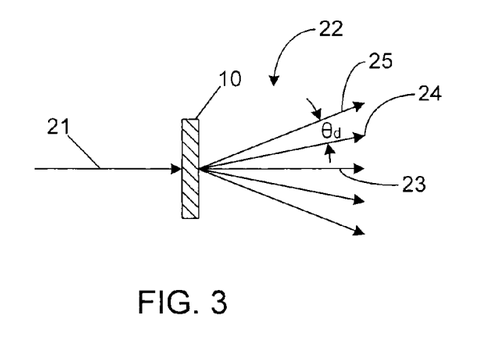
FIG. 3 is a top view of the entire FIG. 1 grating depicting an incident beam and several of the resultant diffracted beams.

FIG. 3 shows the grating 10 and a single incident beam 21. Several of the resultant diffraction beams 22 are depicted, the $0^{th}$ order 23, the $+1^{st}$ order 24, the $+2^{nd}$ order 25, and the symmetrically located respective negative orders. For relatively coarse gratings where $p \gg \lambda$, where $\lambda$ is the wavelength, the small angle approximation is applicable. All adjacent diffraction orders are then conveniently separated by some angle $\theta_d$ and the present embodiment can be succinctly treated with a simplified scalar analysis. Furthermore, the diffraction orders are relatively insensitive to the angle of the incident beam. However, the invention is not restricted to the condition $p \gg \lambda$. The angles between adjacent beams in this and other figures are exaggerated for clarity.

Figure 5:
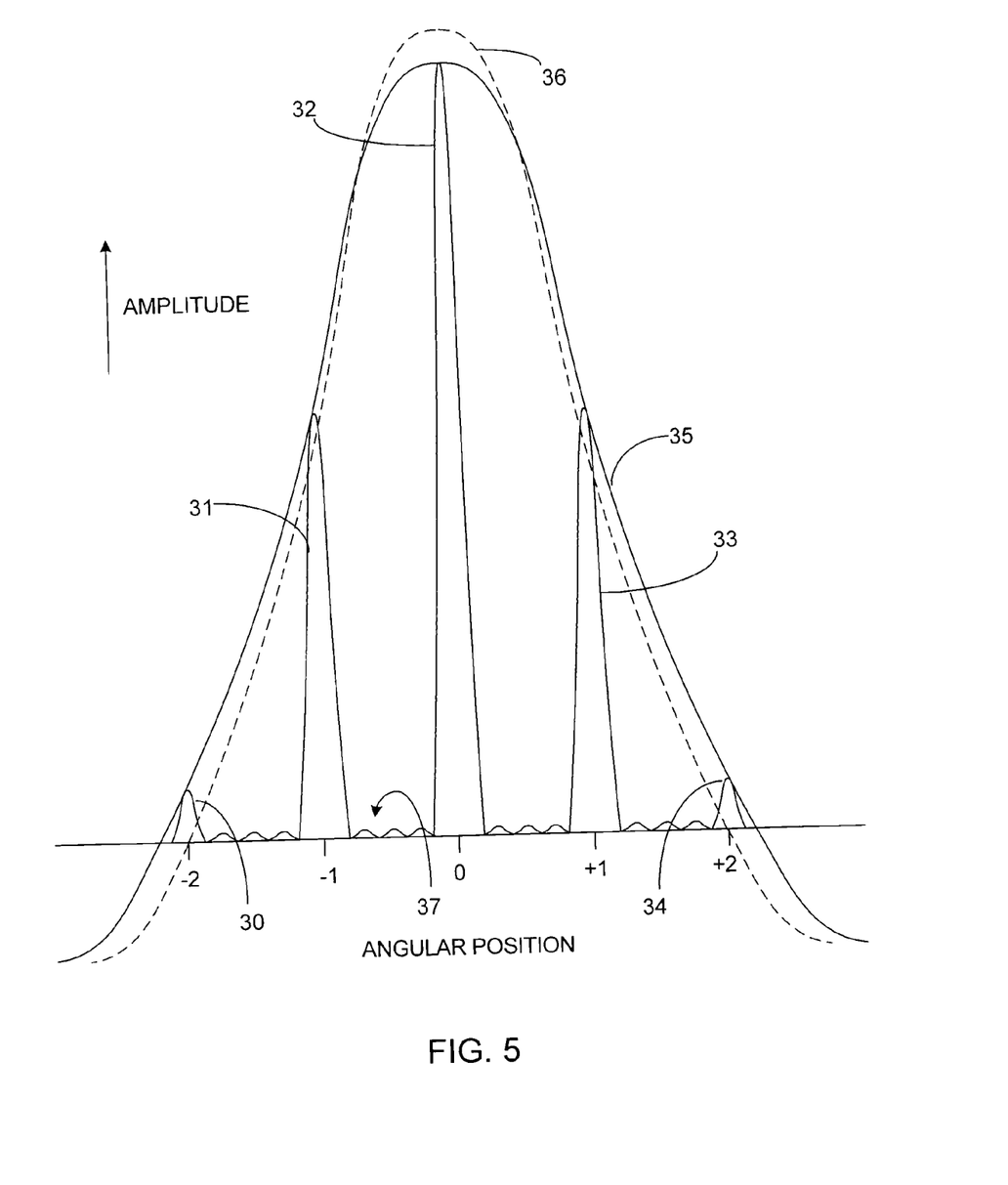
FIG. 5 is graphical representation of diffracted beam amplitudes for the FIG. 1 grating.

The associated amplitudes of the diffraction orders are depicted graphically FIG. 5. Peaks 30, 31, 32, 33, and 34 are respectively the amplitudes $A_i$ of orders $-2, -1, 0, +1$, and $+2$. These amplitudes are determined by the diffraction envelope 35 of a single periodic structure. Higher orders diminish in magnitude and, for simplicity, the consideration of this embodiment is truncated at second order. For comparison, the diffraction envelope 36 is shown for an idealized uniform grating, identical to grating 10 except that its exit face, unlike that of surface 13, is uniformly flat.

In the optical regime, this uniform grating with $r=0.5p$ is referred to as a Ronchi ruling and the flat (piano-plano) transmissive plate onto which the opaque bands are mounted is typically glass. Nevertheless, regardless of the electromagnetic regime, a grating consisting of a simple array of slits that further includes an idealized flat transmissive plate is still a uniform grating as defined above since the relative amplitudes of the orders are not altered.

In FIG. 5, the angular positions of the diffraction orders are the same for the uniform grating as they are for the depicted grating 10 since those positions are a function of p and $\lambda$ and not of the periodic structure 13. However, because of the differences in the diffraction envelope 36 of the uniform grating and the diffraction envelope 35 of grating 10, the respective $0^{th}$, $\pm 1^{st}$, and $\pm 2^{nd}$ order amplitudes are different. For the uniform grating, those amplitudes are 0.524, 0.336, and 0, respectively. For the grating 10 with a curvilinear exit face 13, the respective amplitudes, depicted in FIG. 5, are 0.486, 0.361, and 0.044. The amplitudes are given in arbitrary, normalized units where the incident beam, assumed to be ordinary, is assigned $W=I=1$. Computing the sum of the squares of all five amplitudes in the present truncated approximation yields the value of $\Sigma A_i^2 = \Sigma W_i = 0.5$ for either set of amplitudes. $\Sigma W_i$ is the total of the wave intensities on the five transmitted beams and the value of 0.5 verifies that 50% of the wave intensity of the incident beam is transmitted consistent with the Ronchi ruling which is 50% transmissive. The associated computation of the total transmitted irradiances is trivially $\Sigma I_i = 0.5$ because the Ronchi ruling is 50% transmissive. (Since I and W are proportional to their respective integrated quantities, it follows here that the total transmitted power and the total transmitted probability are also both 50% of their values on the incident beam in further agreement with the Ronchi ruling being 50% transmissive.) A "total output" occupation value computed from the total transmitted irradiance and total transmitted wave intensity $\Omega = \Sigma I_i / \Sigma W_i = 0.5/0.5 = 1 = \Omega_O$ for either grating. However, as a general rule, a total output occupation value is the same value as the occupation value on any of the individual output beams i.e. $\Omega = \Sigma I_i / \Sigma W_i = I_i / W_i$. This equivalence can be demonstrated by noting that equilibration at the exit face of a grating ensures that each irradiance $I_i$ is proportionate to the wave intensity $W_i$ onto which it distributes. The equivalence of the total output $\Omega$ and the individual output beam $\Omega$ is an important calculational convenience.

Applying this equivalence in the present case $\Omega = I_i / W_i = 1 = \Omega_O$ and the diffractive output beams are ordinary when a single (ordinary) beam is incident on a grating. These results for a single incident beam are, in themselves, unremarkable since only ordinary beams are generated, but are critical to a demonstration of the present invention.

Figure 4:
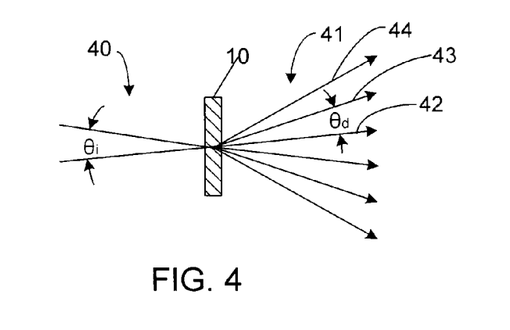
FIG. 4 is another top view of the FIG. 1 grating, similar to FIG. 3 but showing two intersecting incident beams and multiple spatially coincident diffracted beams.

This demonstration is facilitated by considering two equivalent mutually coherent beams 40 incident on the grating 10 as shown in FIG. 4. The resultant multiplicity of output beams 41 is greatly simplified when the angle between the incident beams is the same as the angle between adjacent diffracted beams, i.e., when $\theta_i = \theta_d$. For this condition, various orders associated with each incident beam are spatially coincident. Because of amplitude symmetry in the present example, the sign of the orders can be ignored. With this simplification, diffracted output beam 42 consists of a $0^{th}$ order beam associated with one incident beam coincident with a $1^{st}$ order beam from the other incident beam. Similarly, beam 43 consists of coincident $1^{st}$ and $2^{nd}$ order beams, and beam 44 is simply a $2^{nd}$ order beam because of truncation at second order in this example. The other three output beams are equivalently composed in a symmetrical manner.

Figure 6:
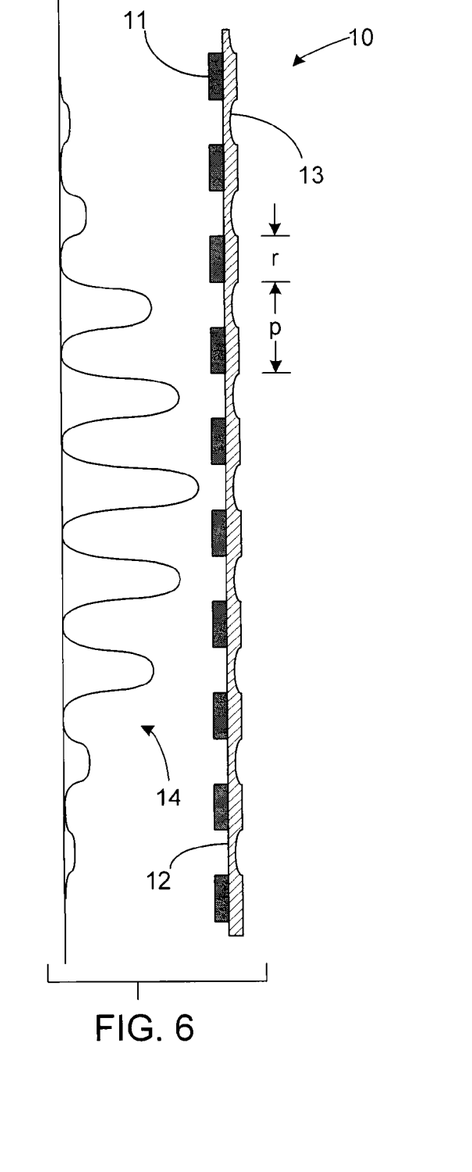
FIGS. 6 and 7 are typical detailed cross-sectional views of the FIG. 1 grating section and show different interference pattern peak alignments of the two incident beams depicted in FIG. 4.
Figure 7:
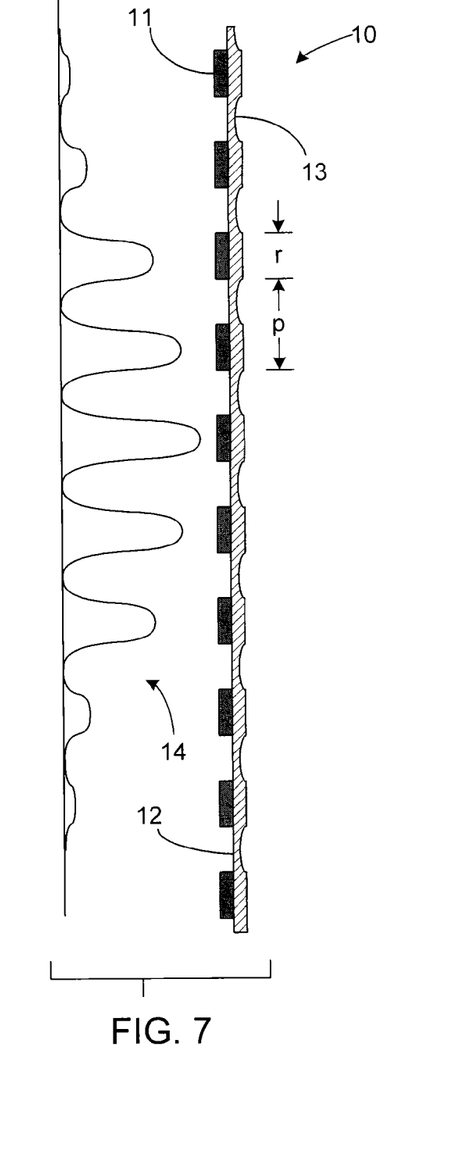

When $\theta_i = \theta_d$, interference pattern periodicity is equal to the grating 10 periodicity p. Two alignments are considered here. In FIG. 6 the interference peaks are aligned with the transmissive bands 12. In FIG. 7 the peak alignment is shifted to the opaque bands 11. A simple scalar treatment is applicable in both of these cases.

The analysis of the FIG. 6 configuration is treated first. In this configuration the amplitudes are algebraically additive and the total transmitted wave intensity is $$\Sigma W_i = 2[(A_0 + A_1)^2 + (A_1 + A_2)^2 + A_2^2],$$

where the $A_i$ values are those obtained above for a single incident beam.

Inserting those values, the total transmitted wave intensity for a uniform grating is $$\Sigma W_{iu} = 1.71.$$

For the grating 10 with the curvilinear exit face 13, the total transmitted wave intensity is $$\Sigma W_{ic}=1.77.$$

The significance of the disparity between these two values is realized upon noting that the total transmitted irradiance is the same in both cases. Specifically, conventional analysis integrating the interference irradiance peaks 14 transmitted by a grating with r=0.5p yields the value of 82.5%. Since two beams, each of unit irradiance, are incident on the grating, the total transmitted irradiance is $$\Sigma I_{iu}=\Sigma I_{ic}=2\times 0.825=1.65.$$

The corresponding total output occupation values are $$\Omega_u=1.65/1.71=0.965$$

$$\Omega_c=1.65/1.77=0.932.$$

These values, by equilibration of irradiance at the exit faces of the gratings, are also applicable to each of the individual output beams in the two respective cases.

The calculated values of $\Omega_u$ and $\Omega_c$, based upon an approximation truncated at second order, demonstrate that the mildly depleted beams associated with the uniform grating are more substantially depleted by the introduction of a suitable modification of the periodic structure as shown by the curvilinear surface 13 in FIG. 2. This increased level of depletion is a non-obvious consequence resulting from the modification to periodic structure.

From a calculational viewpoint, the origin of this increase in depletion can be traced to a well-understood redistribution of the single incident beam amplitudes for the grating 10 with curvilinear exit surface 13 relative to an otherwise equivalent uniform grating. Non-obviously, however, when these redistributed amplitudes are coupled by the spatial coincidence of the FIG. 4 two-beam configuration, the resultant wave intensity is increased.

The FIG. 7 configuration is closely analogous to that of FIG. 6 except that the two beam interference peaks 14 are aligned with the opaque bands 11. Since destructive interference is then aligned with the transmissive bands 12, the two beams are oppositely phased at those bands 12. Consequently the total transmitted wave intensity is $$\Sigma W_i=2[(A_0-A_1)^2+(A_1-A_2)^2+A_2^2].$$

Proceeding as before, $$\Sigma W_{iu}=0.297 \text{ and } \Sigma W_{ic}=0.236.$$

As before, the total transmitted irradiances are again the same for the uniform grating and the grating 10. The complementary percentage transmission for the FIG. 7 configuration is 100%−82.5%=17.5%, which in normalized units gives $$2\times 0.175=0.35=\Sigma I_{iu}=\Sigma I_{ic}.$$

The total output occupation values for this configuration are $$\Omega_u=0.35/0.297=1.18$$

$$\Omega_c=0.35/0.236=1.48$$

which again also apply to each of the individual output beams in the two respective cases.

Consequently, the FIG. 7 configuration provides a modest enrichment for the uniform grating and a significantly increased enrichment when the periodic structure of the grating includes the curvilinear surface 13.

The FIG. 6 and FIG. 7 examples presented here demonstrate novel means of the present invention for producing increased depletion and increased enrichment, respectively, by providing for plano-concave cylinder lenses on the periodic structures of the grating.

As noted above, redistributed amplitudes were shown to generate increased depletion by means of the coupled coincident orders. The same conclusion is equally applicable in the above FIG. 7 example of increased enrichment.

From the foregoing discussion and examples, it may then be appreciated that the scope of the invention broadly encompasses introducing modifications to a uniform periodic grating structure, whereby the coupling of redistributed wave amplitudes in multiple beam configurations yields selectively altered total wave intensities with consequent altered occupation values. More generally, it may also be appreciated the invention also encompasses introducing modifications to the periodic structure affecting the irradiance as well as wave amplitude.

For example, the abrupt transition from opacity to transmissivity shown in FIGS. 2, 6, and 7 can be tapered. This tapering is known in optics as "apodization" and significantly reduces the diffraction envelope lobes beyond the principal central lobe or envelope. Thereby, higher orders are relatively suppressed. Conversely, anti-apodization is associated with a reduced transmissivity in the center of an aperture tapering to increased transmissivity nearer the edges of the aperture. Higher orders are enhanced by anti-apodization.

It is also within the scope of the invention to introduce modifications to a uniform periodic structure by including a graded index of refraction, step structures that introduce phase shifts, or curvilinear refractive configurations.

For reflection gratings, where a uniform grating is defined as an array of reflective planar and absorptive (non-reflective) bands, the modifications to the periodic structure may include a graded reflectivity, a curvilinear reflective contour, reflective step structures that introduce phase shifts and other modifications directly analogous to those of transmission gratings. There is a general equivalency of transmission gratings and reflection gratings with regard to the present invention, Accordingly, it is understood here that in references to grating bands, "opaque" and "transmissive" denote a transmission grating whereas "absorptive" and "reflective" denote an otherwise equivalent reflection grating.

Most generally, the modifications to the periodic structure of uniform gratings, whether they are transmissive or reflective, produce changes in the amplitude and phase of diffraction orders generated by single beams incident on the grating at some angle. When a multiplicity of such single beams, mutually coherent and mutually converging on the grating, are appropriately positioned to provide the requisite interference, the modifications provide for selected occupation values by the control of output irradiance and summation of output wave amplitudes.

Figures 8, 9, 10, 11, 12:
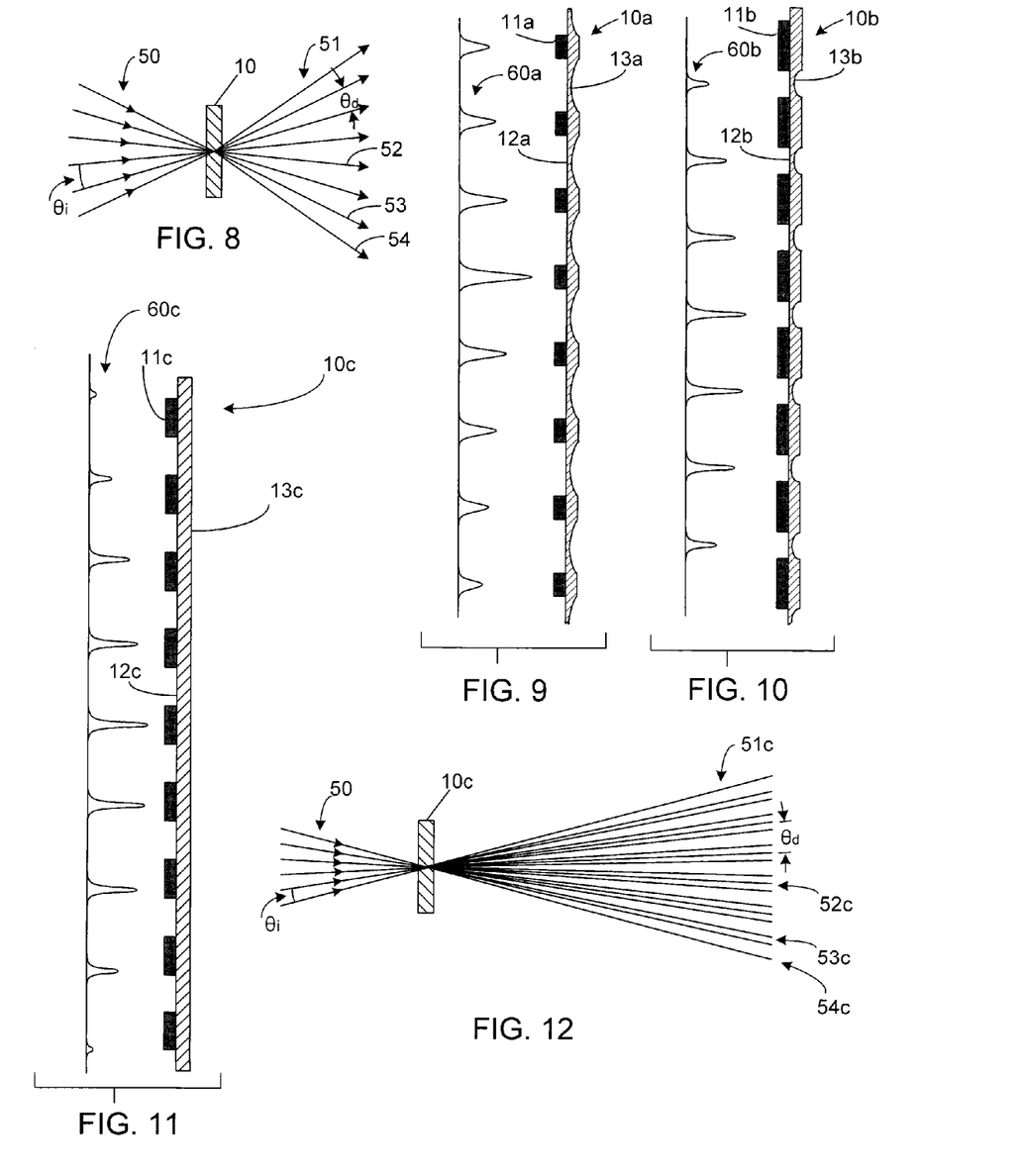
FIG. 8 is a top view of an arbitrary grating with multiple incident beams and multiple spatially coincident diffracted beams.
FIG. 9 is a detailed cross-sectional view of an arbitrary grating showing the relatively sharpened peaks of a multiple beam interference pattern aligned with and matching the grating's relatively narrow opaque regions.
FIG. 10 is analogous to FIG. 9 but shows the relatively sharpened peaks of a multiple beam interference pattern aligned with and matching the grating's relatively narrow transmissive regions.
FIG. 11 is a typical detailed cross-sectional view of a grating with a periodicity slightly differing from the interference periodicity of multiple intersecting incident beams.
FIG. 12 is a top view of the FIG. 11 configuration, illustrating the resultant slightly separated diffracted beams.

In one aspect of the invention, an optimum periodic structure may be employed. The optimum periodic structure is related to the selected multiplicity N of incident beams. An example with N=6 is depicted in FIG. 8. As is well known in the art, the width of the principal interference peaks decreases as the multiplicity N increases. The width of these interference peaks is given by w=2p/N. FIG. 9 shows a grating 10a for which the width r of the opaque bands 11a has been set to r=2p/N. In other words, for N=6, r=p/3.

Therefore, when these interference peaks are aligned with the opaque bands 11a, two objectives relevant to depletion are simultaneously satisfied. The incident irradiance is substantially blocked by the opaque bands 11a and the increased width of regions 12a maximizes transmission of wave intensity for each of the incident beams.

With the condition $\theta_i = \theta_d$, as applied in the example of FIG. 4, beams 51 in FIG. 8 similarly are composed of spatially coincident orders, such as those indicated at 52, 53 and 54. For a uniform grating, beams 51 would generally be diminished in net wave intensity by destructive interference between the amplitudes associated with the coincident orders. Consistent with the present invention, a periodic structure 13a is utilized to redistribute amplitudes such that the total transmitted wave intensity and, consequently, the depletion are maximized.

In FIG. 9, reference numeral 60a indicates the relatively sharpened peaks of a multiple beam interference pattern aligned with and matching the grating's relatively narrow opaque regions 11a. The contour 13a is representative of a generic modification to the periodic structure that accomplishes the requisite redistribution of amplitudes. That modification may be a refractive curvilinear contour, as depicted in FIG. 9, or may be any of the other modifications to periodic structure enumerated above.

FIG. 10 shows an analogous configuration appropriate for enrichment. In this example, the interference peaks associated with the FIG. 8 configuration are aligned with the transmissive regions 12b between adjacent opaque regions 11b of a grating 10b. For this grating, the widths p-r of transmissive regions 12b are narrowed to $w=2p/N$ such that those widths match the widths of the principal interference peaks 60b. For $N=6$, $r=2p/3$. Thereby, two objectives relevant to enrichment are simultaneously satisfied. The incident irradiance is substantially transmitted and the decreased width of regions 12b minimizes transmission of the wave intensity for each of the incident beams.

In analogy to the example in FIG. 9, the depicted contour 13b in FIG. 10 is also intended as a generic representation of a periodic structure that minimizes the total transmitted wave intensity by a redistribution of amplitudes associated individual incident beams. That minimization of wave intensity then maximizes the enrichment.

It may also be appreciated that undesirable constructive or destructive interference between coincident amplitudes can be eliminated by angularly de-coupling those amplitudes. The present invention provides for that means by altering the periodicity p of the periodic structures relative to the periodicity of the incident beam interference as shown in FIG. 11. In that figure, a grating 10c has a generally planar exit face 13c and the central-most interference peak is exactly aligned with an opaque band 11c. However, progressively for neighboring peaks, that alignment shifts towards the edges of the opaque bands 11c.

This angularly de-coupled alignment is realized by marginally setting $\theta_i \neq \theta_d$. In FIG. 12, the resultant output beams from the grating 10c are split into multiple beams relative to those in FIG. 8. The split beams in FIG. 12 consist of the various orders that would otherwise have been coincident. If only $0^{th}$ and $1^{st}$ order beams are significant, a split beam 52c would exhibit a triplet of non-coincident beams in each of the four innermost output beam positions, corresponding to the four innermost input beam 50 positions, as shown in the figure. The output beams 51c also include two pairs of non-coincident beams 53c and the symmetrically located position, derived from the $0^{th}$ order diffraction output from the outermost input beams and the $1^{st}$ order diffraction output derived from the input beams next to the outermost ones. Finally, outputs 54c and the symmetrically located position represent the $1^{st}$ order diffraction outputs derived from the outermost input beams.

In a second case, not depicted, if the more central peaks in FIG. 11 were aligned with transmissive regions 12c, a similar angular de-coupling of coincident amplitudes would occur.

In both cases (the one illustrated by FIG. 11 and the one in which interference peaks are aligned with transmissive regions 12c), angular de-coupling equivalently modifies the value of p itself in the periodic structure and spatially isolates individual amplitudes. In a coincident configuration such as FIG. 8, an output beam's wave intensity which might be, for example, $(A_0 - 2A_1)^2$, would be transformed upon angular de-coupling to three beams with total wave intensity $A_0^2 + 2A_1^2$, as in FIG. 12. Thereby, angular coupling effectively manipulates wave intensity.

Currently, in both cases the transmitted irradiance is not significantly affected by altering the relative periodicities of the grating and the interference pattern. For example, in FIG. 11 because of the Gaussian envelope of the interference peaks 60c, all of the central-most peaks are well blocked by the opaque bands 11c, whereas the more distant peaks, not blocked by those bands are substantially lower in irradiance. For the two described cases, angular de-coupling retains the total output irradiance and respectively increases and decreases the total output wave intensity, which respectively decreases and increases $\Omega$ on the individual output beams.

The various above described means of this invention are used to generate duality modulated beams that may, additionally, be time modulated by conventional means such as directly modulating the source beam. Thereby, a time modulated duality modulated beam constitutes a "signal" beam. Because of the duality modulation, most generally these signal beams are encoded in irradiance I and wave intensity W. A conventional energy sensitive detector is responsive to the irradiance of a signal beam and not to that beam's disproportionate wave intensity. In applications related to receivers, the present invention provides novel transitory beam coupling means for converting such duality modulated signal beams into ordinary signal beams on which the irradiance is restored to a level proportionate to the beam's wave intensity. Accordingly, a conventional energy sensitive detector can then be used to indirectly measure the signal's wave intensity from the irradiance.

Alternatively, in related applications using such novel transitory beam coupling means, an ordinary weak signal beam is enriched by coupling to an enriched beam. Thereby the irradiance component of the signal beam is proportionately increased, effectively amplifying the signal measured by a conventional energy sensitive detector.

Figure 13:
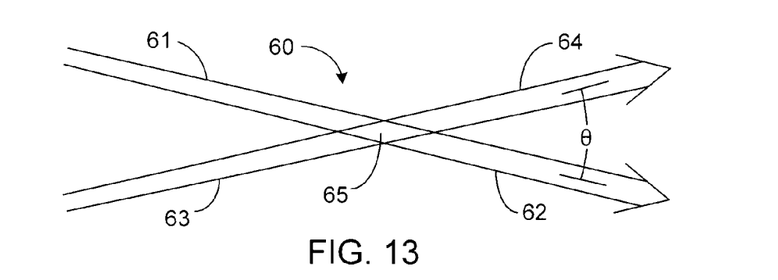
FIG. 13 depicts a transient beam coupler employing a small angle of separation of intersecting beams.

The most fundamental of these novel transitory beam coupling means is shown at 60 in FIG. 13. This coupling means uses angular displacement of intersecting beams 61 and 63. The angular displacement $\theta$ between the intersecting beams is greatly exaggerated here for clarity. Beam 61 emerges as beam 62 and beam 63 emerges as beam 64. The two intersecting beams interfere in region 65 that is greatly increased in length for appropriately small values of $\theta$.

Figure 14:
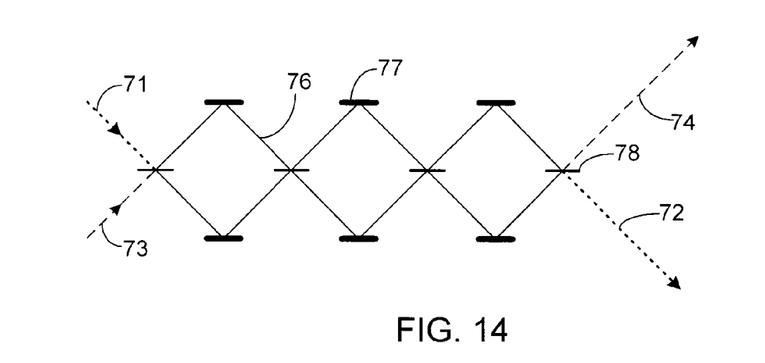
FIG. 14 depicts a transient beam coupler employing a sequence of Mach-Zehnder stages.

FIG. 14 shows an amplitude exchange coupler. The coupler is equivalently a sequence of Mach-Zehnder stages. Input beams 71 and 73 are incident on fractionally transmissive mirrors 78. Mirrors 77 are totally reflective. The input beam alignments provide for coincident propagation of the reflected and transmitted components of the two beams 76 within the coupler. The transmissivity of the mirrors 78 and the number of stages are set such that a single input beam will emerge as a single output beam 72 or 74. This can be understood by noting that (the wave intensity of) a single input beam 71 progressively transfers entirely from the "upper" sector of the coupler to the "lower" sector of the coupler upon passing through some n stages. This transfer is reversed after every additional n stages. Thereby, for some total odd multiple of n stages, a beam 71 emerges as beam 72 and concurrently a beam 73 emerges as beam 74.

Figure 15:
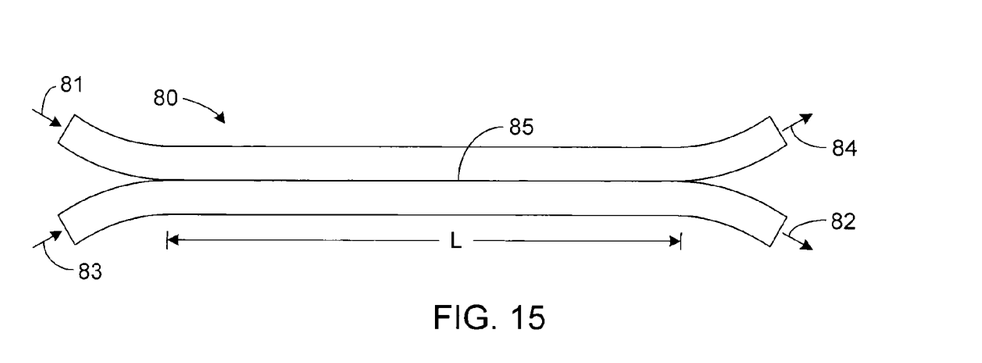
FIG. 15 depicts a transient beam coupler employing a directional coupler.

FIG. 15 shows a version of a directional coupler 80 applicable to the invention and analogous to a conventional fiber optic directional coupler well known in the art. The input beams 81 and 83 undergo evanescent coupling along an interface 85 in a length L of the coupler. Progressive transfer is analogous to that of the FIG. 14 amplitude exchange coupler. Accordingly, the length L and the degree of evanescent coupling are set such that a beam 81 emerges as beam 82 and concurrently a beam 83 emerges as beam 84. This coupler differs from a conventional directional coupler in that an input beam is split into two non-zero parts in the latter.

Figure 16:
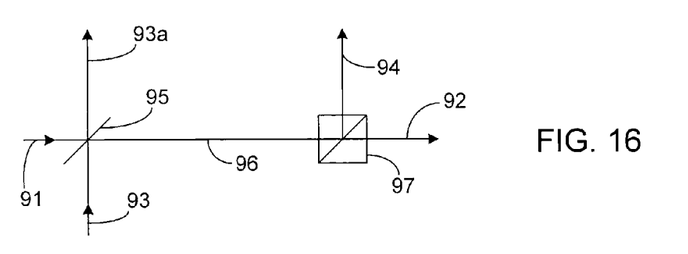
FIG. 16 depicts a transient beam coupler employing polarization separation.

FIG. 16 shows a polarization coupler applicable to the invention. Input beams 91 and 93 are incident on a beam splitter 95 and beam 93 is in part transmitted through the splitter as beam 93a. Beam 93 is polarized 45 degrees relative to the beam 91 polarization. The two input beams propagate coupled as a coincident beam 96 and are incident on a polarizing beam splitter 97 that totally reflects the fractional wave component of beam 93 present on beam 96, along path 94. Polarizing beam splitter 97 also reflects a portion of the fractional wave component of beam 91 present on beam 96. However, transmitted beam 92 is entirely derived from beam 91.

In the foregoing couplers of FIGS. 13-15, there are several common features. The two input beams must be essentially the same wavelength but are not necessarily locked in phase. The wave structures of the two input beams are closely coupled over some finite distance. Over this distance irradiance equilibrates, moving with a net transfer to the beam with the lower occupation value $\Omega$.

For the couplers in FIGS. 13, 14, and 15, the wave component of the "upper" input beam emerges intact as the wave component of the "lower" output beam. An equivalent condition applies to the lower input beam and the upper output beam. In the case of the polarization coupler, FIG. 16, the wave component of the output beam 92 is exclusively that of input beam 91 but reduced in intensity.

From the foregoing it may be appreciated that the wave component of a duality modulated beam introduced into the upper input of any of these couplers will emerge from lower output without the concurrent presence of any wave component introduced at the lower input. The duality modulated beam may be a signal modulated in time to varying levels of depletion and enrichment.

Most generally, an ordinary unmodulated "restorer" beam is introduced into the lower coupler input and transfers irradiance to or from the signal beam depending upon whether the instantaneous signal is depleted or enriched, respectively.

If the restorer beam is selected to have irradiance I and wave intensity W much greater than that of the signal beam, the restorer beam then functions as an infinite source or sink and the equilibration of the signal will be essentially complete. The signal beam emerging from the lower output is then restored to an ordinary beam by losing irradiance to the restorer beam or gaining irradiance from the restorer beam for those time varying portions of the signal that are respectively enriched or depleted.

From a different perspective, it may be appreciated that time modulation of a duality modulated signal is equivalently two superimposed signals, one in I and one in W. Direct reception of the duality modulated signal by an energy sensitive detector provides the I signal. After coupling of the duality modulated signal, the W signal is restored to a proportionate I signal. An energy sensitive detector then indirectly provides the W signal from that proportionate I signal.

Examples of various pre- and post-coupling signals are shown in FIGS. 17A-17D. The examples show signals in pulse form for clarity of description here but, within the scope of the invention, the signals could be in other forms such as analog. In each case illustrated, signals are shown in the form of three time-varying samples. Thus the horizontal axis represents time and the magnitudes of the pulses represent the irradiance I (shown with broken lines) and wave intensity W (shown with solid lines), in arbitrary units.

Figure 17A:
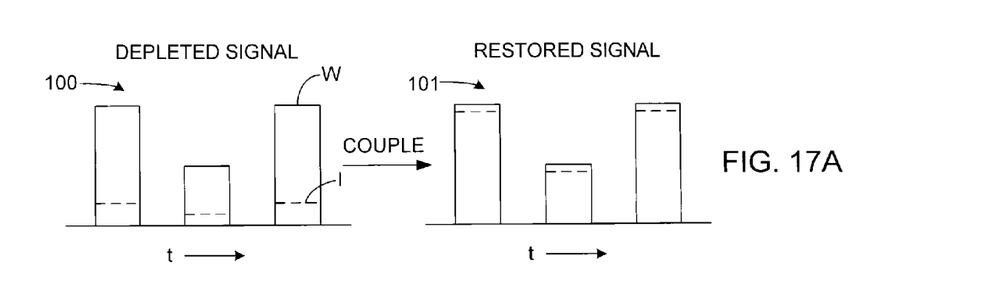
FIGS. 17A through 17D show representative pulse sequences relating to duality modulated signals before and after coupling.

In FIG. 17A, a highly depleted signal 100 is not readily detectable by conventional receiver means, which would detect only the depleted irradiance of the signal. The restored signal 101 is an ordinary readily detectable signal in which the irradiance has been elevated to the level of the wave intensity.

Figure 17B:
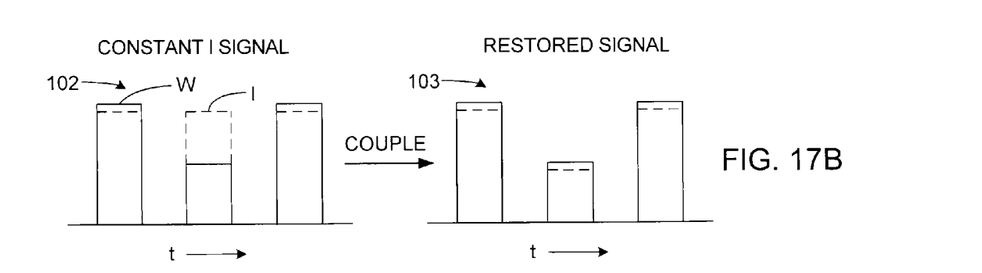

In FIG. 17B, a constant irradiance signal 102 has a modulated wave intensity W which might be approximately equal to the irradiance I ($\Omega$=1), as shown in the first and third pulses, or might be less than I, which is enriched as shown in the second pulse of signal 102. W may also be significantly greater than I, which is depleted rather than enriched, but this possibility is not depicted in FIG. 17B. A conventional receiver configured to receive the signal illustrated by the first three pulses of FIG. 17B would detect an unremarkable and unmodulated constant irradiance I signal and would not detect the W modulation. However, a receiver equipped with appropriate coupling means would measure the W modulation on the restored signal 103 from the proportionate I modulation. More specifically, the restorer functions to deplete the enriched I signal in the middle pulse and has essentially no effect on the first and third pulses because the I level in those was neither enriched nor depleted by modulation. Similarly, a pulse in which the constant I level was depleted with respect to a higher W level (not shown) during modulation would have its I level enriched during the restoring step. In other words, the restored signal will show a variation in I (with time) that tracks the variation in W in the modulated constant I signal.

Figure 17C:
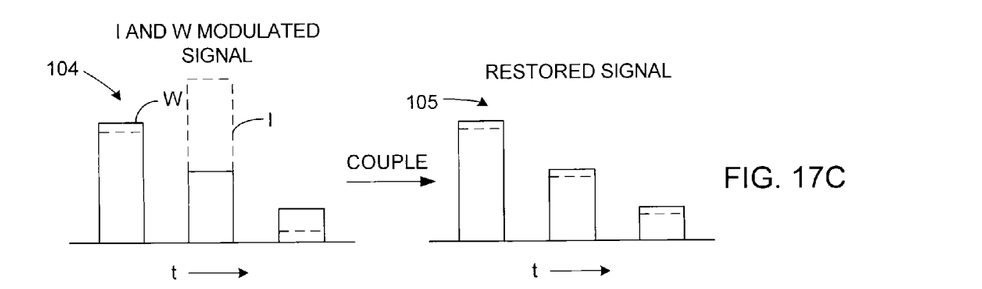

In FIG. 17C, signal 104 is a generalized duality modulated signal that includes, in order, an ordinary pulse, an enriched pulse, and a depleted pulse. In the restored signal 105, the I levels in the second and third pulses are restored to normal levels in proportion to W, which again renders the W modulation indirectly measurable by an energy sensitive detector. The I modulation can be separately measured with a conventional detector before the restoring step.

Figure 17D:
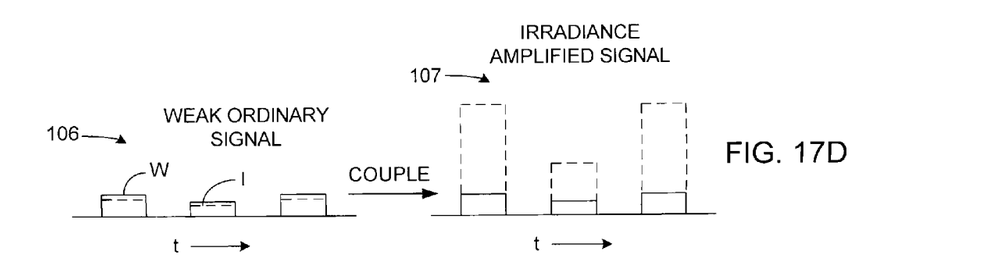

In FIG. 17D, a weak signal 106 that may be an ordinary signal is amplified by coupling to constant highly enriched source. The signal 107 is thereby enriched in irradiance proportionate to but much higher than the modulated weak W levels of the original signal 106. Therefore, this technique can be used to amplify weak ordinary signals that are not duality modulated.

Figure 18:
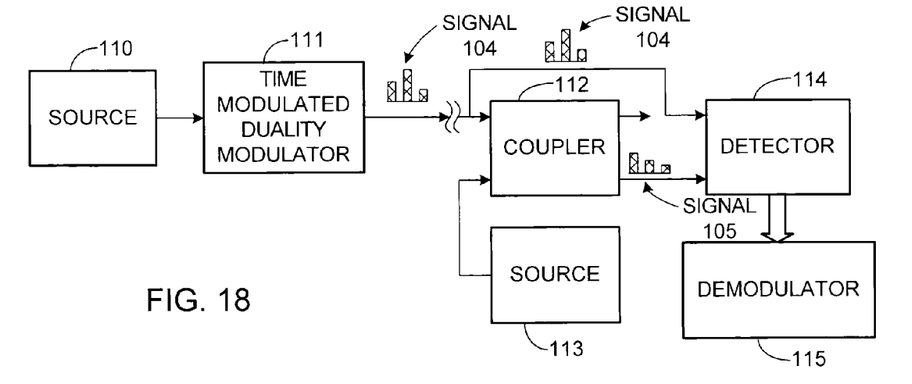
FIG. 18 is a block diagram of apparatus for generating and detecting duality modulated signal beams.

FIG. 18 shows a transmitter and receiver of duality modulated radiation. A source 110 provides an unmodulated coherent beam. A time modulated duality modulator 111 most generally provides a signal 104 that is independently time modulated in at least one of I and W. The modulator 111 may include time modulated generators of enriched beams and of depleted beams. The inclusion of a beam mixer (not shown) in the modulator 111 provides the means to generate a time modulated duality modulated signal like the one shown at 104 in FIG. 17C, by controlling the combined proportion of enriched and depleted beams. Alternatively, a single generator of duality modulated beams is sufficient to produce signal 104 if the output can be modulated between depletion and enrichment. This modulation can be accomplished by introducing a phase shift on the beams incident on the grating to displace the interference pattern peaks from the opaque bands to the transmissive bands which changes the summation of output amplitudes and the resultant duality modulation. Alternatively, one of the optical components, such as the grating 10, may be physically displaced to effect the same result, i.e., duality modulation of the output beam.

The FIG. 18 receiver of duality modulated radiation may include a coupler 112, another source 113 and a conventional detector 114. Direct detection of the unrestored signal 104 provides a measure of I modulation. The received signal 104 is also restored by the coupler 112 using an unmodulated ordinary beam substantially higher in irradiance and wave intensity than those of signal 104. The resultant restored signal 105 input to the energy sensitive detector 114 provides a measure of W modulation. The measures of I and W modulations are processed by a demodulator 115, which recovers the modulating signals.

Figure 19:
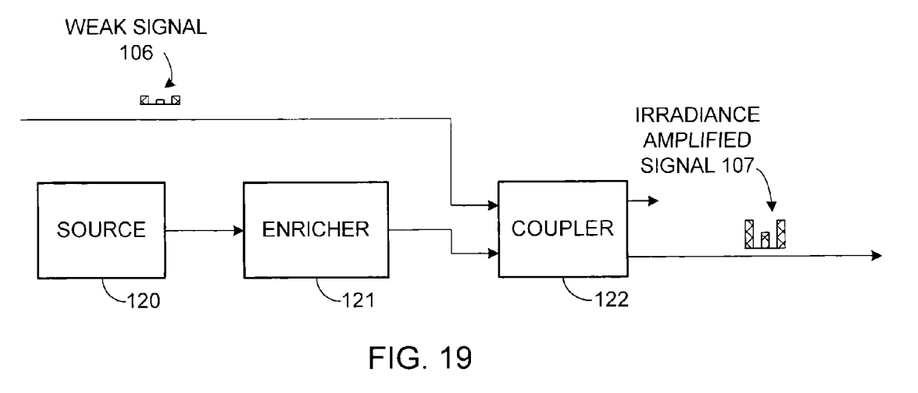
FIG. 19 is a block diagram of apparatus for amplifying a weak signal beam by coupling with an enriched source beam.

FIG. 19 shows the means for providing direct amplification of a weak signal, such as the signal 106 in FIG. 17D. The signal may be an ordinary beam in which $\Omega=1$. The signal 106 is input to a coupler 122. A source 120 and an enricher 121 provide a highly enriched beam to a second input of coupler 122. The resultant output beam 107 retains the same weak W modulation of the original signal 106 but includes an amplified I modulation proportionate to the W modulation. Thereby, the output signal is rendered substantially more detectable by energy sensitive means.

It will be appreciated from the foregoing that the present invention represents a significant advance in apparatus and techniques for handling radiation beams that are not "ordinary" beams with equivalent irradiance I and wave intensity W. The invention teaches various techniques for generating waves that have either enriched or depleted irradiance levels with respect to their wave intensities W and, more generally, teaches a technique in whereby a radiation beam may be duality modulated such that either or both of its I and W levels may be varied for purposes of modulation of the wave. A number of related techniques are disclosed for restoring energy depleted or energy enriched waves to ordinary waves, and a method for amplifying weak radiation signals is also disclosed. Finally, a system for transmitting and receiving information over a duality modulated wave is disclosed.

It will also be appreciated that, although a number of specific embodiments of the invention have been described in detail for purposes of illustration, various modifications may be made without departing from the spirit and scope of the invention. Accordingly, the invention should not be limited except as by the appended claims.

The invention claimed is:

1. A coupler of duality modulated radiation comprising:
a Mach-Zehnder stage having two inputs and two outputs, and further having means for directing first and second input radiation beams into the respective inputs of the Mach-Zehnder stage, wherein the first input radiation beam is duality modulated and the second is not;
wherein the first and second input radiation beams have first and second intensities, respectively, and are both divided onto a first and a second path within the Mach-Zehnder stage;
wherein first and second output radiation beams emerge separately on the outputs of the Mach-Zehnder stage with unchanged first and second intensities, respectively;
and wherein irradiance on the first and second input beams is at least partially equilibrated within the Mach-Zehnder stage.

2. A coupler of duality modulated radiation as defined in claim 1 and further comprising:
at least one additional Mach-Zehnder stage, making a total of n such stages, each additional stage having two inputs and two outputs, and further having means for directing first and second output radiation beams from an immediately preceding Mach-Zehnder stage into the respective inputs of each additional Mach-Zehnder stage;
wherein first and second output radiation beams emerge separately on the outputs of the $n^{th}$ Mach-Zehnder stage with unchanged first and second intensities, respectively;
and wherein irradiance on the first and second input radiation beams is equilibrated within the successive n Mach-Zehnder stages, which together contribute to equilibration to a greater degree than a single Mach-Zehnder stage.

3. A coupler of duality modulated radiation as defined in claim 2, wherein each additional Mach-Zehnder stage and an immediately preceding Mach-Zehnder stage have a common first input and first output, respectively, and have a common second input and second output, respectively.

4. A coupler of duality modulated radiation as defined in claim 2, wherein the means for directing first and second output radiation beams from an immediately preceding Mach-Zehnder stage into the respective inputs of an immediately succeeding additional Mach-Zehnder stage include at least one mirror positioned in the path of each of the first and second output radiation beams and oriented to reflect those first and second output radiation beams into the respective inputs of the immediately succeeding additional Mach-Zehnder stage.

5. A method for coupling duality modulated radiation in a Mach-Zehnder stage having two inputs and two outputs, the method comprising:
directing first and second input radiation beams into the respective inputs of the Mach-Zehnder stage, wherein the first input radiation beam is duality modulated and the second is not and wherein the first and second input radiation beams have first and second intensities, respectively, and;
dividing the first and second input radiation beams onto a first and a second path within the Mach-Zehnder stage;
outputting first and second output radiation beams on the outputs of the Mach-Zehnder stage, the first and second output radiation beams having unchanged first and second intensities, respectively;
at least partially equilibrating irradiance on the first and second input beams within the Mach-Zehnder stage.

6. A method as defined in claim 5, wherein the method employs at least one additional Mach-Zehnder stage, making a total of n such stages, each additional stage having two inputs and two outputs, and wherein the method further comprises:
directing first and second output radiation beams from an immediately preceding Mach-Zehnder stage into the respective inputs of an immediately succeeding additional Mach-Zehnder stage;
outputting first and second output radiation beams separately on the outputs of the $n^{th}$ Mach-Zehnder stage, wherein the first and second output radiation beams from the $n^{th}$ Mach-Zehnder stage have unchanged first and second intensities, respectively; and equilibrating irradiance on the first and second input radiation beams within the successive n Mach-Zehnder stages, which together contribute to equilibration to a greater degree than a single Mach-Zehnder stage.

7. A method as defined in claim 6, wherein the step of directing includes reflecting from at least one mirror positioned in the path of each of the first and second output radiation beams and oriented to reflect those first and second output radiation beams into the respective inputs of the immediately succeeding additional Mach-Zehnder stage.

* * * * *